United States Patent [19]
Lacey

[11] 3,841,561
[45] Oct. 15, 1974

[54] CONTROLLABLE WATER TURBINE MOTOR FOR IRRIGATION MACHINE

[76] Inventor: Edward H. Lacey, Box 796, Trent, S. Dak. 57065

[22] Filed: Aug. 31, 1973

[21] Appl. No.: 393,612

[52] U.S. Cl................. 239/189, 239/191, 415/158
[51] Int. Cl............................................. B05b 3/00
[58] Field of Search .......... 239/189, 191, 237, 240; 415/158

[56] References Cited
UNITED STATES PATENTS
| | | | |
|---|---|---|---|
| 3,297,307 | 1/1967 | Jahns | 415/158 UX |
| 3,489,352 | 1/1970 | Diggs | 239/189 |
| 3,628,731 | 12/1971 | Phillips | 239/189 |

*Primary Examiner*—M. Henson Wood, Jr.
*Assistant Examiner*—Michael Mar
*Attorney, Agent, or Firm*—Clarence A. O'Brien; Harvey B. Jacobson

[57] ABSTRACT

A water powered turbine motor utilized for driving an irrigation machine in which the water being discharged through the irrigation machine serves to power the machine. The turbine motor is provided with an adjustable control assembly whereby the output shaft of the turbine motor may be controlled so that the rate of movement of the irrigation machine may be controlled.

10 Claims, 7 Drawing Figures

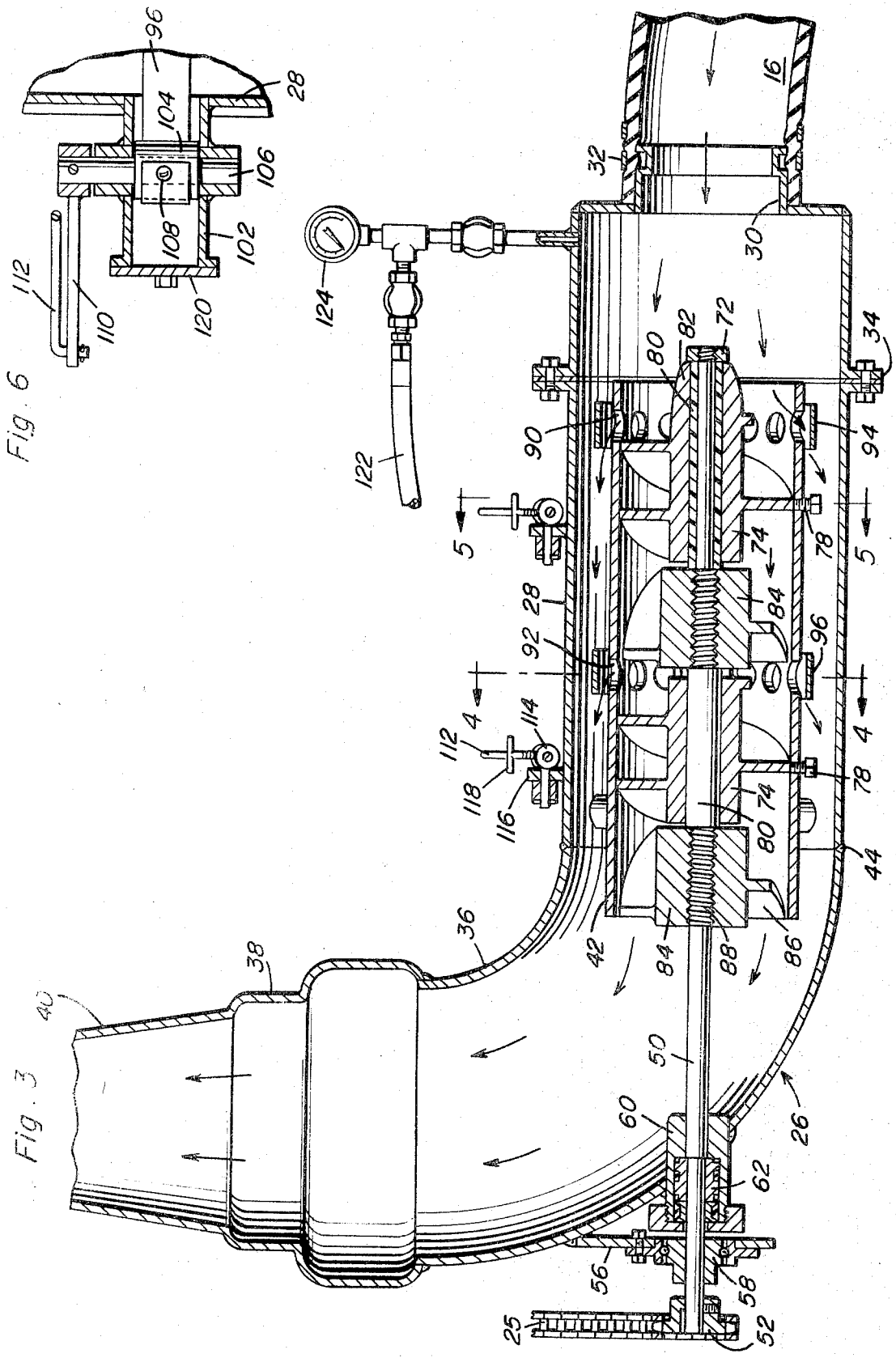

3,841,561

CONTROLLABLE WATER TURBINE MOTOR FOR IRRIGATION MACHINE

BACKGROUND OF THE INVENTION

1. Field of the Invention

The present invention generally relates to self-propelled, hose dragging irrigation machines and, more particularly, a controllable turbine motor utilizing water passing through the irrigation machine to propel the machine at a controlled rate of speed.

2. Description of the Prior Art

There is a commercially available irrigation machine which is self-propelled and drags a flexible supply hose connected thereto which is pulled along the ground surface in a manner well known in the art. The irrigation machine includes a rotating nozzle for discharging water and is propelled by a rotatable winch drum driven by a water turbine motor with a flexible cable connected to the drum being anchored at a remote point. This type of irrigation machine is disclosed in prior U.S. Pat. No. 3,489,352. One of the problems which exist in the present day machines is an absence of control of the output speed of the water turbine motor. In actual practice, a substantial variation in the output speed of the water turbine motor occurs from the beginning of movement across a particular field to the completion of the run. In some instances, the speed at the end of a 1,320 foot run of this type of irrigation machine reduces to less than one-half of its original speed. Additionally, there is no initial control of the output speed of the water turbine motor on this type of machine such as disclosed in the aforementioned patent.

SUMMARY OF THE INVENTION

An object of the present invention is to provide a novel water turbine motor for a self-propelled, hose dragging irrigation machine incorporating a control assembly that may be easily and quickly adjustable so that the speed of travel of the irrigation machine may be accurately controlled in order to correlate the speed of travel with the quantity of water available to the machine and also enable accurate and precision control of the quantity of water applied to a given land surface area.

Another object of the invention is to provide a water turbine motor incorporating multiple turbine drive assemblies enclosed in a casing oriented in the flow path of water passing through the irrigation machine, together with escape ports associated with each of the turbine drive assemblies and control bands associated with the escape ports to control the water flow through the turbine assemblies for reducing friction loss to a minimum and utilizing only that energy necessary to propel the machine.

A further object of the invention is to provide a water turbine motor in accordance with the preceding objects in which the control bands are adjustable from a position externally of the flow path of the water either manually or automatically, if desired, with the entire structure being relatively simple, thus long lasting and dependable and also relatively inexpensive to manufacture, install, operate and maintain.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a longitudinal, sectional view taken substantially upon a plane passing along section line 3—3 of FIG. 2 illustrating the structural details of the water turbine motor.

FIG. 6 is a fragmental sectional view taken substantially upon a plane passing along section line 6—6 of FIG. 4 illustrating further structural details of the mechanism for actuating the control band.

DESCRIPTION OF THE PREFERRED EMBODIMENT

Figure 1:
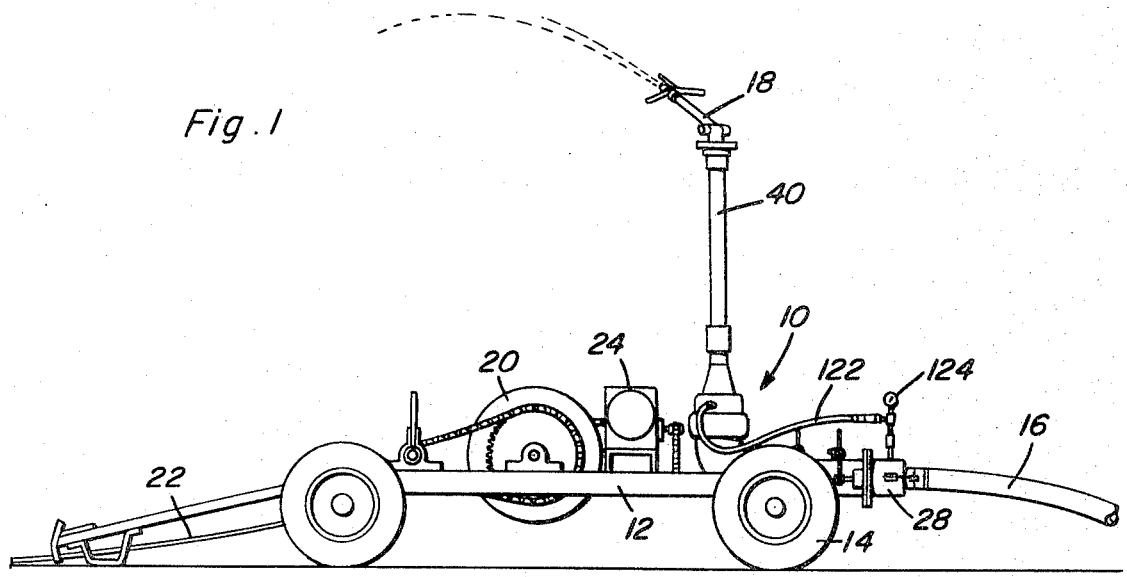
FIG. 1 is a side elevational view of a self-propelled irrigation machine of the type in which the controllable water turbine motor of the present invention is incorporated.

Referring now specifically to the drawings, the self-propelled, hose dragging, water powered irrigation machine is generally designated by the reference numeral 10 and includes a frame 12, supporting wheels 14, a flexible supply hose 16 connected thereto, a rotatable discharge nozzle 18 communicated therewith, a winch drum 20 having a cable 22 connected thereto by which the machine is pulled across a land area to be irrigated. The winch drum 20 is driven through a reduction gear assembly 24 having an input from a drive chain 25 which is powered by a water turbine motor which is driven by the water passing from the hose 16 to the discharge nozzle 18. This basic structural assembly is commercially available and generally is disclosed in U.S. Pat. No. 3,489,352.

The present invention relates to a turbine motor disposed in the water flow path between the hose 16 and the discharge nozzle 18 and is best illustrated in overall association in FIG. 3 and is generally designated by reference numeral 26.

The turbine motor assembly includes a tubular housing 28 of cylindrical construction which is horizontally disposed and provided with a reduced entrance adapter 30 at the end thereof to which the flexible hose 16 is connected with the connecting means including suitable clamp bands 32 and the like. The housing 28 includes a flanged coupling 34 adjacent the inlet adapter 30 but spaced slightly therefrom to facilitate removal of, repair of and access to the interior of the tubular housing 28. Rigid with and forming an extension to the tubular housing 28 is a tubular ell 36 terminating in a reducing adapter 38 which connects with an upwardly extending discharge pipe 40 having the rotatable discharge nozzle 18 on the upper end thereof.

The turbine motor assembly 26 includes a turbine cage or casing 42 in the form of a cylindrical member positioned concentrically within the tubular housing 28 and in spaced relation thereto whereby water flowing through the tubular housing will partially flow through the tubular casing 42 and partially between the tubular casing 42 and the tubular housing 28. The tubular casing 42 is slightly larger than the inlet adapter 30 and is in axial alignment therewith but spaced therefrom as illustrated in FIG. 3 so that the inlet water will primarily be directed at the inlet end of the tubular casing 42. The discharge end of the tubular casing 42 is disposed in the area of the ell 36 where it is connected to the tubular housing 28 such as by welding 44 or the like.

The tubular cage or casing 42 is secured rigidly to the tubular housing 28 by the provision of a plurality of circumferentially spaced, radially extending bosses 46 having internally threaded sockets therein receiving anchor bolts 48 which extend radially inwardly through corresponding apertures in the tubular housing 28 thereby rigidly but detachably mounting the tubular cage 42 concentrically in the tubular housing 28. The position and location of the mounting bosses and bolts may be varied but it has been found to operate successfully if the mounting structure is oriented as illustrated in FIG. 3, that is, with the bosses 46 oriented adjacent to the discharge end of the turbine casing 42.

Disposed concentrically in the turbine casing 42 and also, of course, concentrically in the tubular housing 28, is a turbine shaft 50 which has the output end thereof extending outwardly of the curved wall of the ell 36 with the outer end of the shaft 50 including a sprocket gear 52 engaged with the drive chain 25 for driving the winch drum 20 through the reduction gear unit 24. The outer end of the shaft 50 is supported by a bracket 56 rigid with the ell 36 and a bearing assembly 58 carried by the bracket 56. Also, a stuffing box 60 is incorporated into the wall of the ell 36 and a suitable seal assembly 62 is provided for sealing the shaft 50 where it goes through the ell 36 to prevent leakage around the rotatable shaft 50.

Mounted on the shaft 50 and disposed within the turbine casing 42 is a first turbine assembly 64 and a second turbine assembly 66 which are rigid with respect to the shaft 50 and have a periphery disposed in closely spaced relation to the interior of the turbine casing 42 but disposed in rotatable relation thereto. Also mounted on the shaft 50 is a first water director or deflector 68 and a second water director or deflector 70 which are fixedly secured to the tubular turbine casing 42 and which rotatably receive the shaft 50. The end of the shaft 50 remote from the sprocket gear 52 is provided with a retaining nut 72 thereon for retaining all of the components of the turbine motor on the shaft 50 with the end of the shaft 50 having the retaining nut 72 thereon disposed generally in alignment with the inlet end of the turbine casing 42 although slightly projecting towards the inlet adapter 30 as illustrated in FIG. 3.

Each of the water directors 68 and 70 includes a central hub 74 with a plurality of spiral vanes or flights 76 integral therewith and which are constructed to closely fit into the turbine casing 42 and which are rigidly secured in place by set screws 78 which extend through tapped holes in the turbine casing 42 and engage the periphery of the vanes 76. Thus, the water directors 68 and 70 are rigidly fixed into the tubular casing 42 with the shaft 50 being journalled in an internal bore through the hub 74 in which the bore is provided with a sleeve bearing 80 bonded thereto which may be of plastic material, such as nylon, or the like. Also, the hub 74 on the first water director 68 is slightly extended and tapered as at 82 for providing a smoother surface to be engaged by the incoming water as it enters the tubular turbine casing 42.

Each of the turbines 64 and 66 includes a central hub 84 having a plurality of spiral vanes or flights 86 thereon which are spirally oriented in opposite direction to the spiral vanes 76 on the water directors. Also, the spiral vanes 86 are provided with a periphery closely spaced from the interior surface of the tubular casing 42 so that when water flows axially through the turbine casing 42, the turbines 64 and 66 will be caused to rotate thus rotating the shaft 50 by virtue of the hubs 84 having internally screw threaded bores for rigid screw threaded engagement with threaded portions 88 on the shaft 50. With the nylon bearings 80 being slightly longer than the hubs 74 and the hubs 84 fixedly secured in place by their screw threaded engagements, the nylon bearings 80 will maintain a slightly spaced relationship between the hubs and also journal the shaft 50 with the turbines 64 and 66 rotating therewith during axial flow of water through the turbine casing 42.

Figure 2:
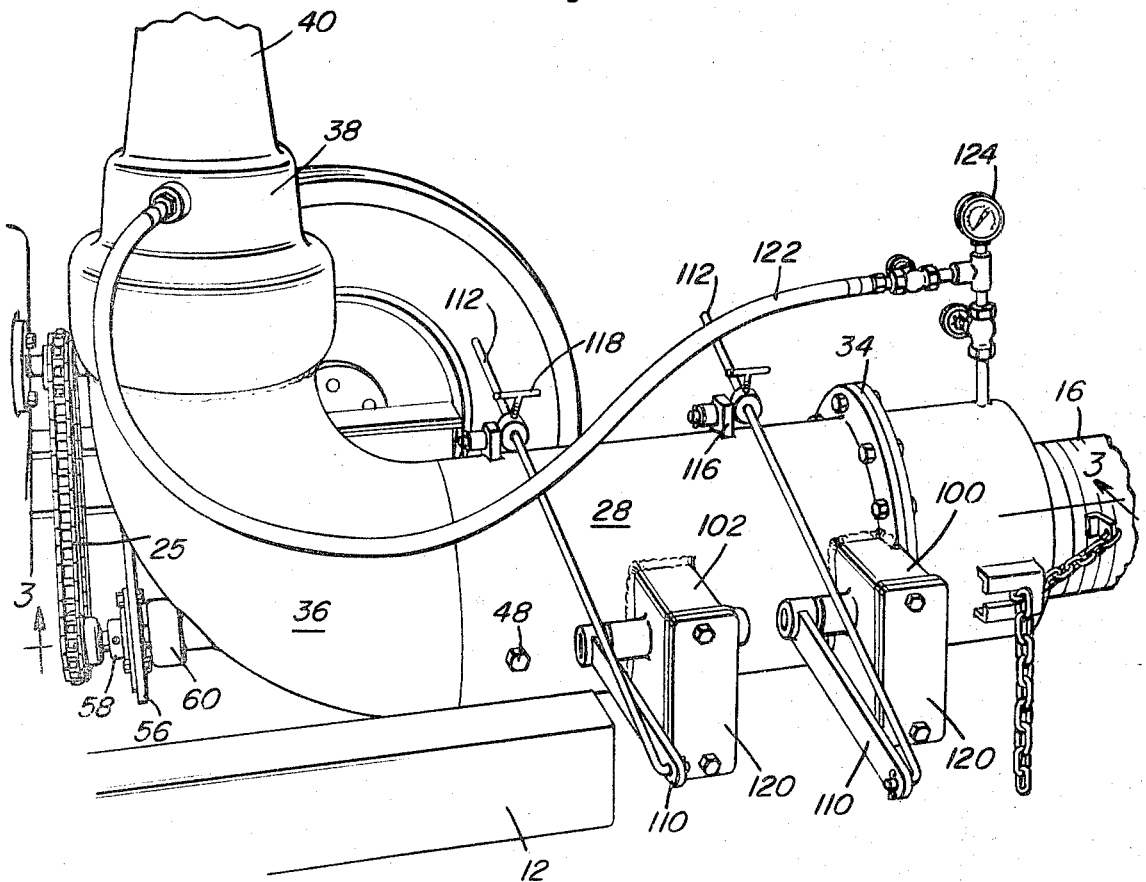
FIG. 2 is a perspective view of a housing of the irrigation machine through which water flows to the discharge nozzle and in which the water turbine motor is incorporated.
Figure 5:
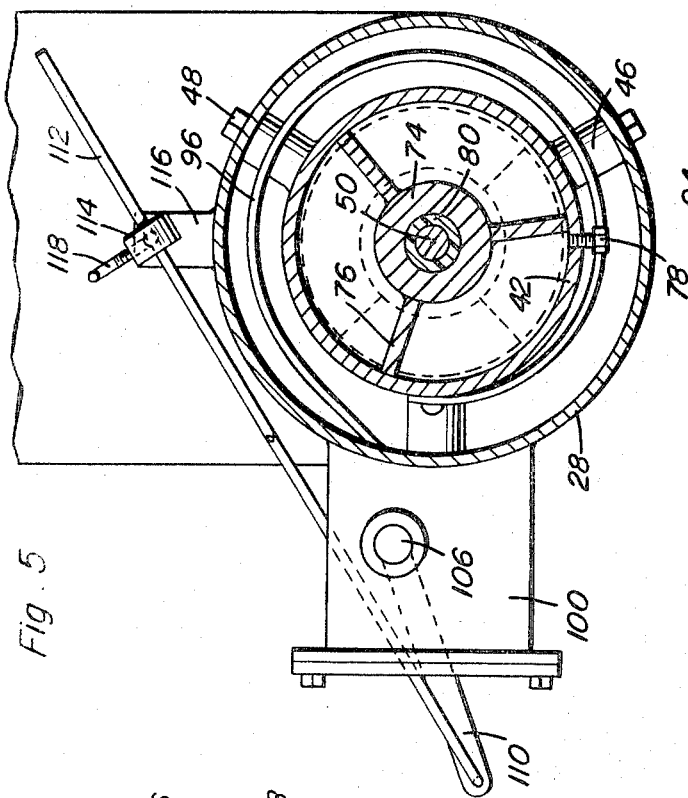
FIG. 5 is a transverse, sectional view taken substantially upon a plane passing along section line 5—5 of FIG. 3 illustrating further structural details of the water turbine motor.
Figure 7:
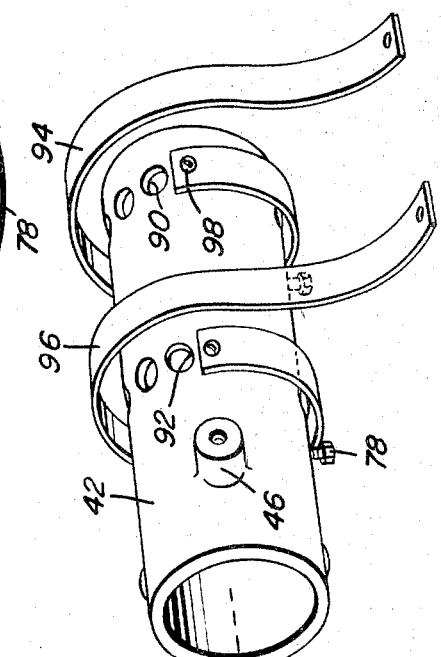
FIG. 7 is an exploded group perspective view of a water turbine motor illustrating the components thereof in exploded orientation.
Figure 4:
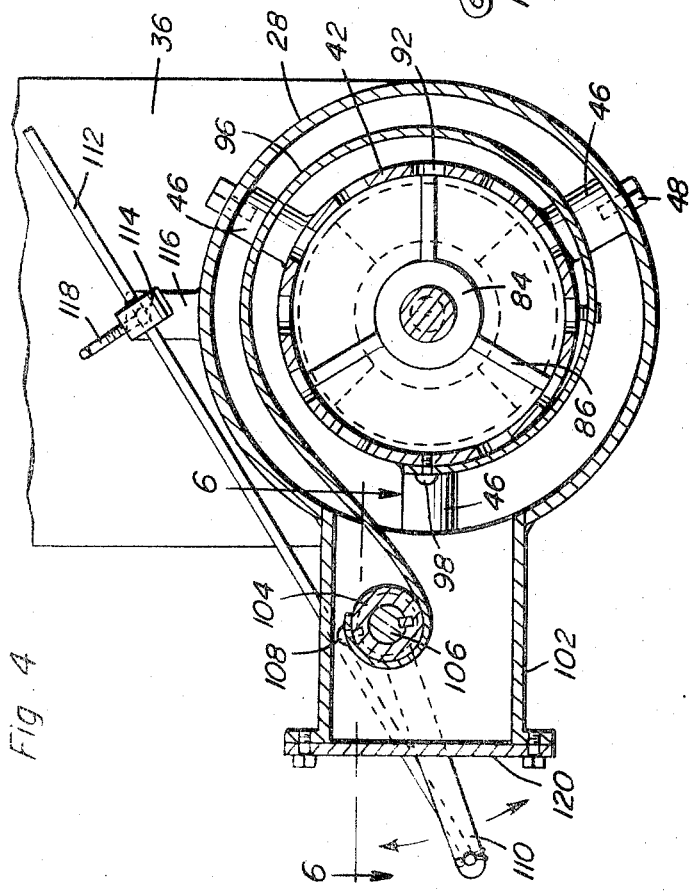
FIG. 4 is a transverse, sectional view taken substantially upon a plane passing along section line 4—4 of FIG. 3 illustrating the structural details of the turbine casing, escape ports and control band.

The turbine casing 42 is provided with two circumferential rows of ports with the first row of ports being designated by numeral 90 and the second row of ports being designated by numeral 92. The first row of ports 90 is located adjacent the inlet end of the turbine casing 42 and generally in alignment with the initial portions of the spiral vanes 76 on the first water director 68 as illustrated in FIG. 3. The second set of ports 92 are oriented in alignment with the initial portion of the vane 76 on the second water director 70. The ports permit passage of water out through the casing 42 which, in effect, will reduce the axial flow of water through the casing 42 thereby reducing the output power on the shaft 50 as compared to an arrangement in which the tubular casing 42 is imperforate. In order to control the outlet flow of water through the ports 90 and 92, a pair of flexible control bands 94 and 96 are provided. The bands 94 and 96 are disposed in alignment with the rows of ports 90 and 92, respectively, and one end of each of the bands 94 and 96 is anchored to the casing 42 by a suitable fastener 98 as illustrated in FIG. 7. The other end of each of the bands 94 and 96 extends radially outwardly of the tubular housing 28 into a pair of laterally extending tubular housings 100 and 102, respectively, provided integrally with the tubular housing 28 as illustrated in FIG. 2. As illustrated in FIG. 4, the band 96 for the second set of ports 92 has its free end partially wrapped around and secured to a cylindrical enlargement 104 on a shaft 106 with the end of the band being secured by a suitable fastener 108. The shaft 106 is journalled transversely of the housing 102 and one end thereof is provided with an offset crank arm 110 fixed thereto in any suitable manner. The outer end of the arm or lever 110 is connected to an operating rod 112 which extends through a rockably supported collar 114 that is pivotally supported by a bracket 116 rigid with the tubular housing 28. A set screw 118 is provided in the collar 114 to lock the rod 112 in adjusted position longitudinally thereby enabling the strap 96 to be wound onto the cylindrical adapter 104 on the shaft 106 or unwound therefrom. As illustrated in FIGS. 4 and 5, when the strap is unwound from the shaft, the major portion of it is spaced away from the corresponding ports to permit substantially unrestricted flow through a substantial number of the ports. However, when the band is tightened by rotating the shaft 106 or by moving it in an angular manner by moving the rod 112 longitudinally, the band is collapsed around the tubular casing 42 into close proximity to substantially all of the ports thus throttling or restricting the flow of water out through the ports.

Each of the laterally extending housings 100 and 102 has a removable end plate 120 attached thereto to enable disconnection of the straps when desired and the relative positions of the ends of the straps may be adjusted by providing spaced holes in the straps for receiving the fasteners so that the throttled position of the two straps may be initially adjusted as desired. Also, rather than a manual adjustment, the position of the rods 112 may be varied by a conventional fly-ball type of governor driven by the output shaft 50 so that a substantially constant speed may be attained by the output shaft 50 by selectively tightening and loosening the bands 94 and 96. Another manner of controlling the bands is by utilizing any suitable speed control device that is associated with the cable as it is wound onto the winch drum 20 so that the linear rate of speed of the machine may be maintained. However, by employing the two water directors and the two turbines, the axial flow through the motor may be initially adjusted for a precise rate of speed of the machine which will be maintained substantially constant since the rate of flow through the turbine casing 42 will be substantially the same even though there may be variation in the inflow of water through the hose 16 since the tubular casing 42 is substantially in alignment with the inlet adapter 30 and substantially all of the water passing into the tubular housing 28 will enter the inlet end of the turbine casing 42.

A flexible hose or conduit 122 is provided between the inlet end of the housing 28 and the discharge adapter 38 which includes a pressure gauge 124 therein and control valves by which the pressure differential across the turbine motor may be determined. The entire assembly may be easily installed in the tubular housing 28. The shaft structure 50 includes a left and right hand thread arrangement for the two turbines so that they will be locked in position and the bearing 80 and portion of the shaft which it engages is slightly larger than the threaded surfaces to provide an abutment for the hubs 84 on the turbines thus facilitating assembly and disassembly of the components and which enables such components to be assembled on the shaft and inserted into the tubular housing 28 with the flanged connection 34 disconnected and the assembled casing 42, shaft 50, water directors 68 and 70 and turbines 64 and 66 then being inserted into the housing 28 and secured in place by the retaining bolts 48. Thus, the entire motor may be easily removed from the casing 28 and the components of the motor may then be easily disassembled for replacement and repair.

The multiple turbine drive that is enclosed in the tubular casing with the band type throttling devices controlling flow of water through the escape ports which are ahead of the water directors in the turbine casing allows the water to be held in the turbine casing 42 or dumped into the large outer passage between the casing 42 and the housing 28. This arrangement reduces the friction loss to a minimum and utilizes only the energy that is necessary to provide the desired speed and maintains a substantially constant speed even though manually set inasmuch as only a fraction of the power available is actually used so that even if the water flow is reduced, the output will remain the same insofar as the speed is concerned.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new as follows:

1. In a self-propelled irrigation machine having a pressured water inlet and a discharge means, that improvement comprising a water powered turbine assembly incorporated into the flow path between the water inlet and discharge means for powering the machine, said turbine assembly including a tubular housing defining the flow path from the inlet to the discharge means, a shaft rotatably disposed in the housing and including one end extending outwardly of the housing for powering the machine, turbine means fixed to the shaft for rotating the shaft in response to axial flow of water in the flow path, and means controlling the axial flow of water in relation to the turbine means thereby controlling the output of said shaft and enabling said shaft to be driven at a substantially constant speed by utilizing only a portion of the power capable of being produced by maximum water flow thereby enabling constant output of the shaft even if water flow is reduced, said means controllng water flow including means within said housing enabling a controlled portion of the water in the flow path to flow radially outwardly of the periphery of the turbine means and then axially in the housing.

2. In a self-propelled irrigation machine having a pressured water inlet and a discharge means, that improvement comprising a water powered turbine assembly incorporated into the flow path between the water inlet and discharge means for powering the machine, said turbine assembly including a tubular housing defining the flow path from the inlet to the discharge means, a shaft rotatably disposed in the housing and including one end extending outwardly of the housing for powering the machine, turbine means fixed to the shaft for rotating the shaft in response to axial flow of water in the flow path, and means controlling the flow of water in relation to the turbine means thereby controlling the output of said shaft and enabling said shaft to be driven at a substantially constant speed by utilizing only a portion of the power capable of being produced by maximum water flow thereby enabling constant output of the shaft even if water flow is reduced, said means controlling the water flow including a tubular casing disposed concentrically in the housing and in spaced relation thereto, said tubular casing closely receiving said turbine means, said turbine means including a pair of longitudinally spaced turbines rigid with the shaft with the peripheries of the turbines being disposed adjacent the interior of the casing, said casing including escape ports associated therewith to permit water to flow outwardly from the interior of the casing to the space between the casing and the housing, and means controlling the rate of flow through the ports thereby controlling the water flow from the inlet through the casing and turbines.

3. The structure as defined in claim 2 wherein said means controlling flow of water through the ports includes a flexible band having one end anchored to the casing with the remainder of the band being selectively spaced away from the exterior of the casing or movable to a position closely adjacent the exterior of the casing for controlling flow of water through the ports, and means tightening and releasing said band.

4. The structure as defined in claim 3 wherein said means for tightening and releasing the band includes a rotatable shaft having the other end of the band attached thereto, and a control rod connected with the shaft for oscillating the shaft for tightening and releasing the band.

5. The structure as defined in claim 2 together with a pair of water directors mounted rigidly within said casing on the upstream side of said turbines, each of said water directors including a plurality of spiral vanes thereon, said water directors journalling said shaft and directing the water into an angular flow path, each of said turbines including a plurality of spiral vanes thereon spiraled oppositely to the vanes on the water directors for utilizing the angular displacement of the water caused by the directors to impart rotation to the turbines and shaft.

6. The structure as defined in claim 5 wherein said means controlling flow of water through the ports includes a flexible band having one end anchored to the casing with the remainder of the band being selectively spaced away from the exterior of the casing or movable to a position closely adjacent the exterior of the casing for controlling flow of water through the ports, and means tightening and releasing said band.

7. The structure as defined in claim 6 wherein said means for tightening and releasing the band includes a rotatable shaft having the other end of the band attached thereto, and a control rod connected with the shaft for oscillating the shaft for tightening and releasing the band.

8. The structure as defined in claim 7 wherein said casing includes a plurality of radially projecting bosses thereon, fastening means extending through the housing into engagement with the bosses on the casing thereby removably supporting the casing within the housing to enable easy removal thereof, said water directors being fixedly secured to the tubular casing by set screws engaging the outer periphery of the vanes thereby detachably connecting the water directors to the tubular casing and enabling removal of the shaft, turbines and water directors from the casing thereby facilitating assembly and disassembly of the turbine assembly.

9. A turbine motor comprising a tubular casing defining an axial flow path for fluid, a shaft supported within said casing, a turbine means mounted on said shaft and within said casing to impart rotation to said shaft upon axial flow of fluid in the casing, and means associated with said casing upstream from the turbine means to discharge a controlled proportion of fluid from the casing without engagement with the turbine means thereby controlling the output characteristics of the turbine means and shaft, said turbine means including a pair of turbines mounted on the shaft in longitudinally spaced relation, a fluid director mounted rigidly within the casing upstream of each turbine to impart angular movement to the fluid passing axially therethrough, said means discharging fluid from the casing including escape port means in said casing and generally aligned with a respective fluid director for lateral discharge of fluid from the casing, and controllable means selectively and adjustably opening and closing said port means for varying the flow of fluid therethrough and controlling the output characteristics of the turbines.

10. The structure as defined in claim 9 wherein said controllable means includes a peripheral band aligned with the port means, and means moving said band radially in relation to said port means for controlling flow therethrough.

* * * * *